United States Patent

Laudon

[11] Patent Number: 6,108,301
[45] Date of Patent: Aug. 22, 2000

[54] CIRCUIT, ARCHITECTURE AND METHOD FOR REDUNDANT DATA COMMUNICATIONS LINKS

[75] Inventor: Michael K. Laudon, Monte Sereno, Calif.

[73] Assignee: Cypress Semiconductor Corporation, San Jose, Calif.

[21] Appl. No.: 08/923,495

[22] Filed: Sep. 4, 1997

[51] Int. Cl.[7] .............................. G06F 11/00; H04J 3/17; H04L 1/00; H04B 3/38

[52] U.S. Cl. .......................... 370/220; 370/228; 370/433; 340/825.01; 340/825.06; 340/827

[58] Field of Search ..................... 370/216, 217, 370/218, 219, 220, 225, 227, 228, 453, 433; 340/825.01, 825.06, 825.16, 825.17, 827, 825.5

[56] References Cited

U.S. PATENT DOCUMENTS

| | | | |
|---|---|---|---|
| 5,153,874 | 10/1992 | Kohno | 340/825.01 |
| 5,426,420 | 6/1995 | Nagler | 340/825.01 |
| 5,596,569 | 1/1997 | Madonna et al. | 340/827 |
| 5,754,536 | 5/1998 | Schmidt | 370/433 |
| 5,796,717 | 8/1998 | Shinbashi et al. | 370/216 |
| 5,870,032 | 2/1999 | Eslambolchi | 340/827 |

*Primary Examiner*—Hassan Kizou
*Assistant Examiner*—Afsar M. Quresai
*Attorney, Agent, or Firm*—Wagner, Murabito & Hao LLP

[57] ABSTRACT

A communication unit, coupled to a communication link, may be enabled if a signal is present on the communication link and the unit is active. However, if no signal is present on the communication link, the communication unit generates a token used to activate another communication unit coupled to another communication link. This token may be generated after a delay which allows the communication unit to wait some time for the signal to appear on the communication link before generating the token. Where a communication unit has been activated and enabled, that communication unit may receive signals from the communication link or transmit signals onto the communication link. Selecting a first communication unit from a number of communication units to be activated may be accomplished by coupling one of the communication units to a start-up circuit. The start-up circuit provides a start-up token to activate the first communication unit.

23 Claims, 8 Drawing Sheets

CHIP ENABLE STATE MACHINE/STATE TABLE

| CONDITION | PRESENT STATE | | INPUT | | | NEXT STATE | | RESET TIMER | TRIGGER-TIMER | OUTPUT | |
|---|---|---|---|---|---|---|---|---|---|---|---|
| | D1 | D0 | EDGE | SIGNAL DETECT | TIMEOUT | D1 | D0 | | | CHIP ENABLE | TOKEN |
| 1 | 0 | 0 | 0 | X | X | 0 | 0 | 0 | 0 | 0 | 0 |
| 2 | 0 | 0 | 1 | X | X | 0 | 1 | 0 | 0 | 0 | 0 |
| 3 | 0 | 1 | X | 0 | X | 1 | 0 | 0 | 1 | 0 | 0 |
| 4 | 0 | 1 | X | 1 | X | 0 | 1 | 0 | 0 | 1 | 0 |
| 5 | 1 | 0 | X | 0 | 0 | 1 | 0 | 0 | 0 | 0 | 0 |
| 6 | 1 | 0 | X | 1 | X | 0 | 1 | 1 | 0 | 1 | 0 |
| 7 | 1 | 1 | X | 0 | 1 | 1 | 0 | 1 | 0 | 0 | 0 |
| 8 | 1 | 1 | X | X | X | 0 | 0 | 0 | 0 | 0 | 1 |

FIGURE 6

CIRCUIT, ARCHITECTURE AND METHOD FOR REDUNDANT DATA COMMUNICATIONS LINKS

FIELD OF THE INVENTION

The present invention relates to communication systems and, in particular, to the use and selection of one of a number of communication paths within such a system.

BACKGROUND

In computer networks, the use of redundant communication links has become a primary means of insuring that system down time is minimized when a communication link is lost. in some networks, the failure of the physical medium which comprises the communication link is a primary source of network problems (e.g., down time). Such failures, coupled with the increased use of local area network architectures, have increased the demand for allowing for a timely selection of one of a number of redundant links.

Recognizing the need for redundant links within communication networks, system designers have attempted to devise switching circuits, external to the communication units that exchange data over these links, which allow the individual communication units to be selected. Unfortunately, this external logic requires more components and is more expensive.

FIG. 1a illustrates a conventional scheme for selecting among redundant communication units/links. In this system, communication unit 105 and communication unit 106 may each be associated with a single network unit (e.g., a server or other device which may be part of a computer or other communication network) but are not directly coupled to each other. Instead, the communication units are coupled to one another through an external switching circuit consisting of voltage source 104, two switches 102 and 103 and power supply 101. In this way, each communication unit signals its availability to the external switching circuit without notifying the other communication units. For example, if communication unit 105 is active, it transmits a signal to voltage source 104, which, in turn, activates switch 102. Switch 102 will close and complete the circuit between power supply 101 and communication unit 105. As a result, communication unit 105 will be enabled so that it may receive or transmit signals on data line 107. Alternatively, if communication unit 106 is active, switch 103 will be closed (e.g., in response to a signal from voltage source 104), allowing communication unit 106 to be enabled for communication over data line 108.

FIG. 1b illustrates another conventional configuration for a communication system employing redundant communication links. In this configuration, an external arbiter 110 is used to observe signals produced by one or more communication units which indicate that the respective communication unit has detected an active link. In such a configuration, upon receipt of an indication that a particular communication unit has detected an active communication link, the arbiter 110 may enable an appropriate pair of pass gate transistors (e.g., transistor pair Q1 and Q2 or transistor pair Q3 and Q4) to allow PHY 112 to communicate via the active link. In yet another alternative configuration, such as is shown in FIG. 1c, a PHY 114 may be configured to perform its own internal selection of a communication unit upon receipt of a signal indicating that a communication unit has detected an active link.

Configurations such as those shown in FIGS. 1a and 1b require additional, external switching circuitry for each new communication unit/data line pair. It would be desirable to have a system, expandable to any number of links, that avoids such limitations. Further, although systems such as that shown in FIG. 1c avoid the need for external circuitry, such systems require complex PHY units (e.g., PHY 114) which include on-board arbitration circuitry or the like. It would be desirable to avoid the need for such complex PHY units in a system employing redundant communication links.

SUMMARY OF THE INVENTION

Described herein is a redundant link architecture for data communications and methods of using the same. In one embodiment, the present invention provides a method of enabling a communication unit, coupled to a communication link, if a signal is present on the communication link. However, if the signal is not present on the communication link the communication unit generates a token which may be used to activate another communication unit. This token may be generated immediately or after a delay. The delay allows the communication unit to wait some time for the signal to appear on the communication link before generating the token. The token generated at the communication unit may be transmitted to another communication unit. When a communication unit has been activated and enabled, that communication unit may receive signals from an associated communication link or transmit signals onto the communication link.

Furthermore, the present invention provides a method of selecting one communication unit from a series of communication units before enabling one of the communication units. In one embodiment, a method for determining which of the communication units will be activated first is provided. The first communication unit to be activated can be any one of the communication units. For example, the first communication unit to be activated may be coupled to a start-up circuit. When the first communication unit receives a start-up token from the start-up circuit, the first communication unit will be activated.

In yet a further embodiment, the present invention provides a communication system that includes a switching circuit and a start-up circuit coupled between two communication units. The switching circuit is configured to select one of many communication units to operate in the communication system. The start-up circuit is configured to determine which of the communication units will operate first.

BRIEF DESCRIPTION OF THE DRAWINGS

The present invention is illustrated by way of example and not limitation in figures of accompanying drawings in which:

FIG. 6 is a state table for a chip enable state machine according to one embodiment of the present invention.

DETAILED DESCRIPTION

Described herein is a redundant link architecture for data communications and methods of using the same. In one embodiment, a communication unit, coupled to a communication link, may be enabled if a signal is present on the communication link. However, if no signal is present on the communication link, the communication unit generates a token which may be used to activate another communication unit coupled to another communication link. The token may be generated immediately if no signal is present on the communication link or the token may be generated after a delay which allows the communication unit to wait some time for the signal to appear on the communication link. Ultimately, the token may be transmitted to the other communication unit. When one communication unit has been activated and enabled, that communication unit may receive signals from an associated communication path or transmit signals onto the associated communication path.

Furthermore, the present invention allows for activating a particular communication unit from a series of communication units before enabling one of the communication units. For example, the particular communication unit to be activated can be any one of the communication units and may be coupled to a start-up circuit. When the communication unit receives a start-up token from the start-up circuit, the communication unit will be activated.

In yet a further embodiment, the present invention provides a communication system that includes a switching circuit and a start-up circuit coupled between two communication units. The switching circuit is configured to select one of a number communication units to operate in the communication system. The start-up circuit is configured to determine which of the communication units will operate first.

Figure 1A:
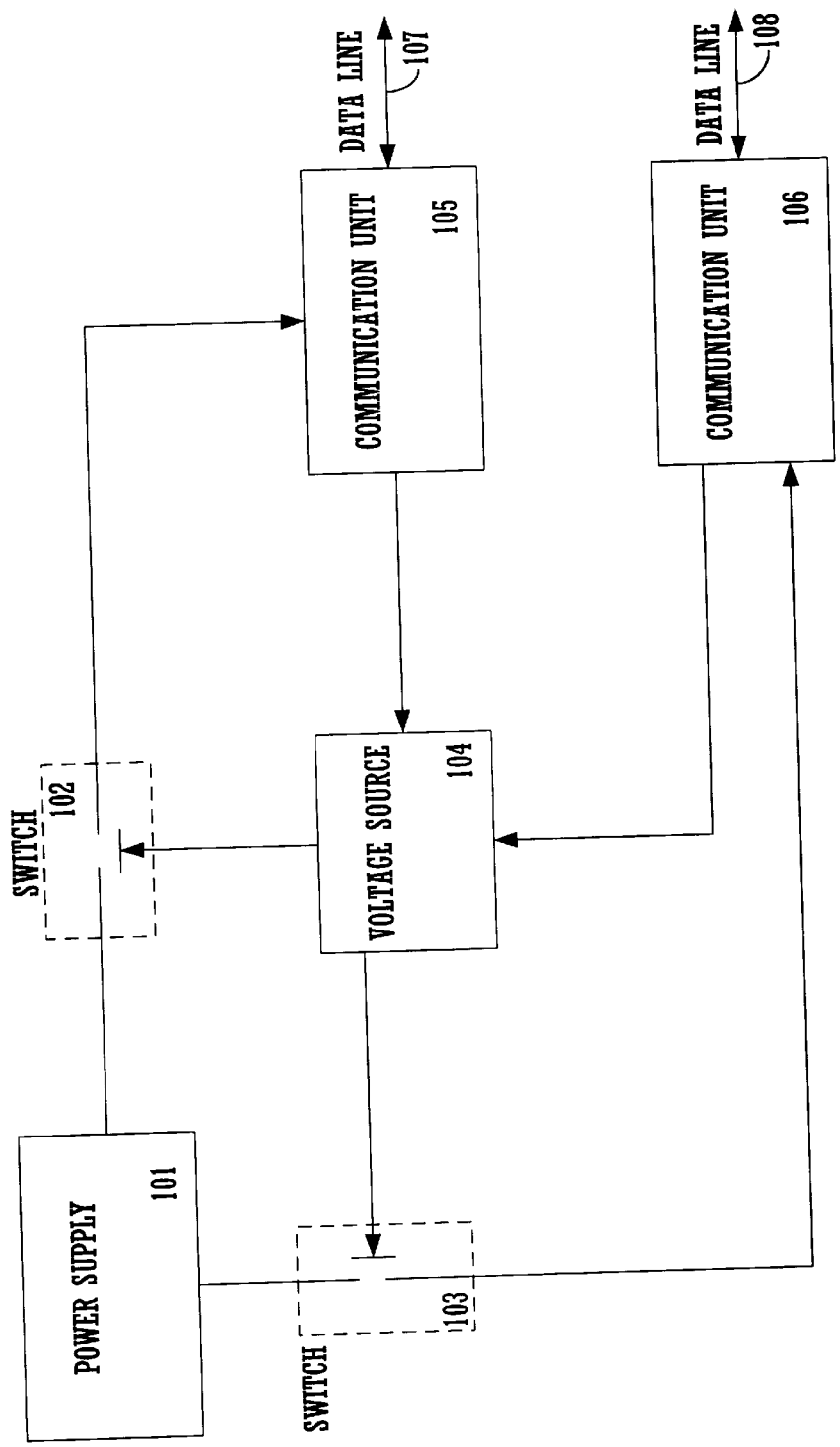
FIG. 1a illustrates a communication system which uses circuitry external to individual communication units in order to accomplish switching between redundant communication links.
Figure 1B:
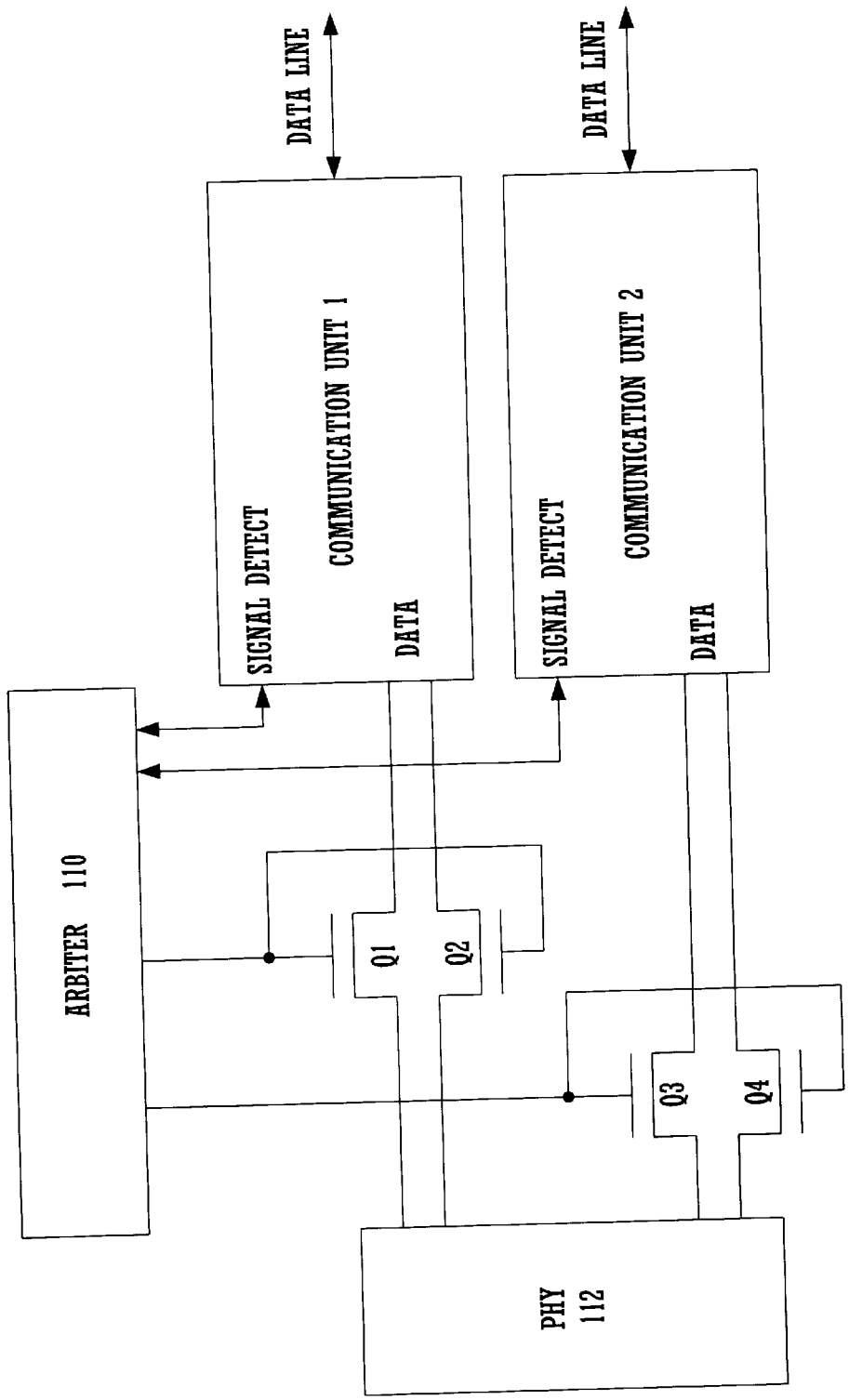
FIG. 1b illustrates another communication system which uses external arbitration circuitry in order to accomplish switching between redundant communication links.
Figure 1C:
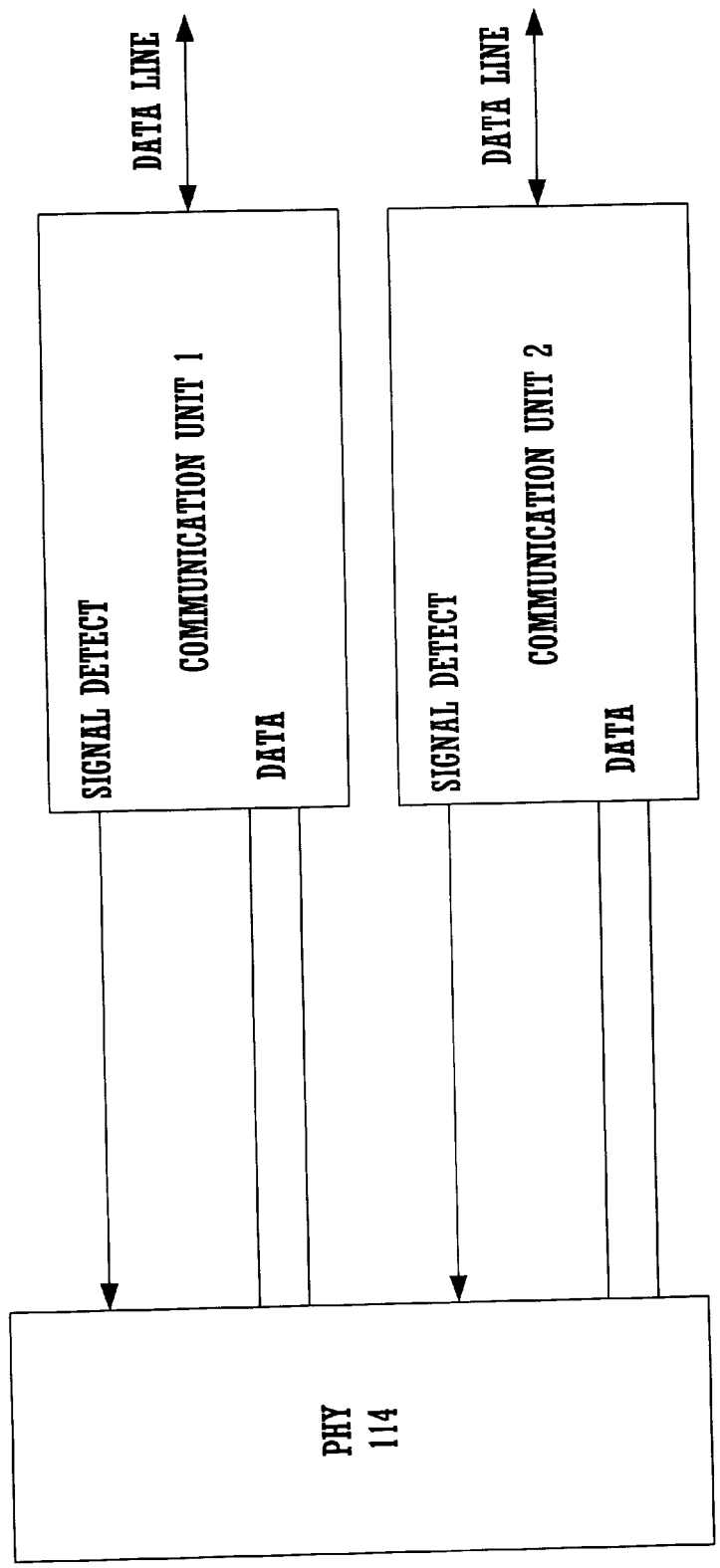
FIG. 1c illustrates a communication system which uses circuitry internal to a PHY unit in order to accomplish switching between redundant communication links.
Figure 2:
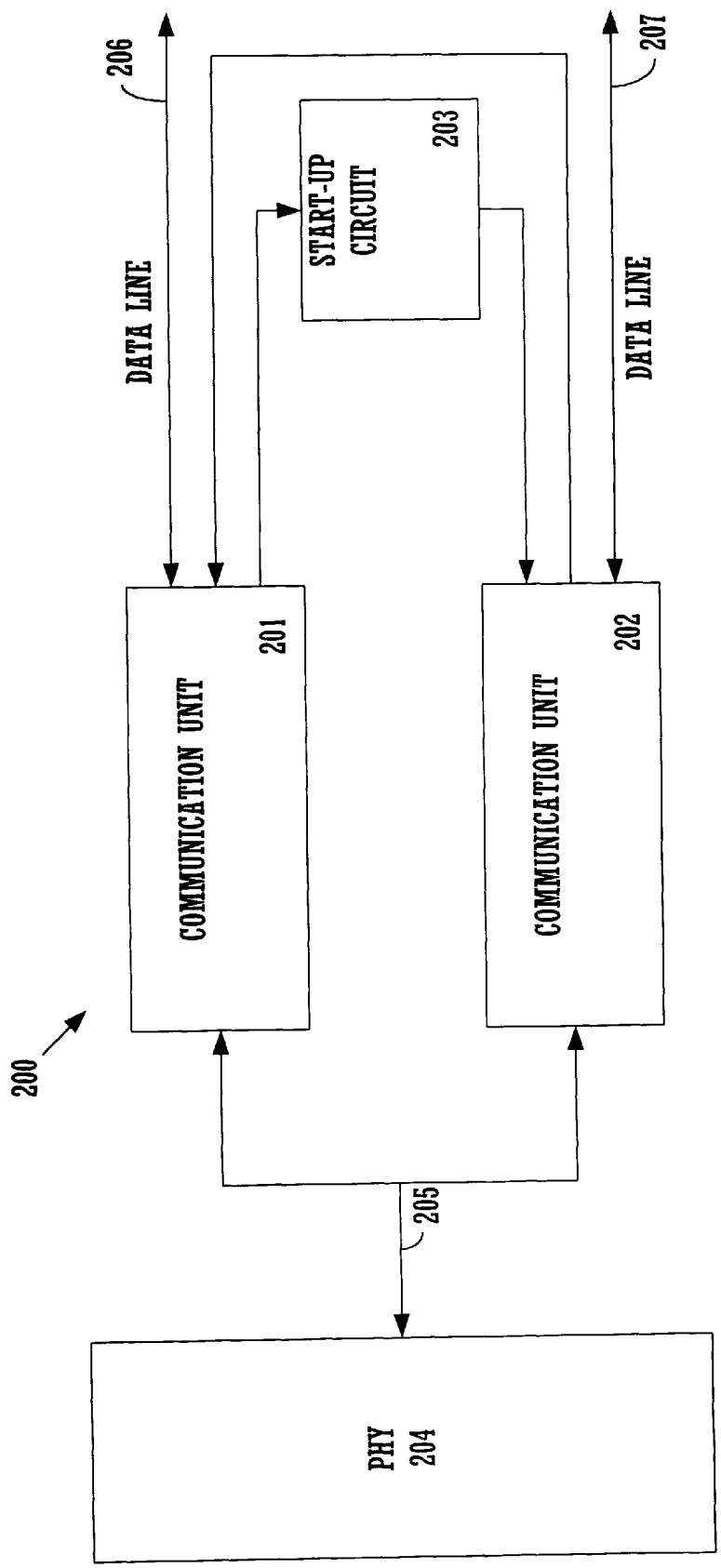
FIG. 2 illustrates a communication system including two communication units and a startup circuit configured according to one embodiment of the present invention.

FIG. 2 illustrates a communication system 200 which includes a switching architecture in accordance with one embodiment of the present invention. PHY layer 204 is coupled to communication unit 201 and communication unit 202 through interface 205. The redundant linking scheme allows both communication units 201 and 202 to be bussed together on interface 205. In general, communication units 201 and 202 may be any devices configured to communicate over a data link. For example, communication units 201 and 202 may be transceivers adapted to communicate over fiber optic links.

The configuration illustrated in FIG. 2 allows a single PHY layer (e.g., PHY 204) to have access to a series of redundant links via multiple transceivers (or multiple separate receiver/transmitter pairs). As a result of this configuration, the redundant links (e.g., data lines 206 and 207 with their associated communication units 201 and 202) offer the PHY layer alternative independent communication paths which may be used in the event of a link failure. For example, PHY layer 204 has access to redundant data lines 206 and 207 by way of redundant communication units 201 and 202, respectively. The present invention allows such operation without the disadvantages of the prior art schemes discussed above. For example, the present invention provides communication units 201 and 202 configured such that each unit may determine whether it is coupled to an active link (e.g., one of data lines 206, 207). The communication units 201 and 202 are coupled to each other so that once one of the communication units determines that it is not coupled to an active link, it may activate the other communication unit to determine whether that other communication unit is coupled to an active link.

FIG. 2 also illustrates start-up circuit 203 which may be configured to determine which communication unit 201 or 202 will be activated first upon system power up. Start-up circuit 203 is coupled between communication units 201 and 202 and, when the communication system 200 first powers up, start-up circuit 203 may manipulate an initial voltage so that only one communication unit, either 201 or 202, may be activated first. The first communication unit to be activated will begin the process of determining whether it is coupled to an active link.

Figure 3:
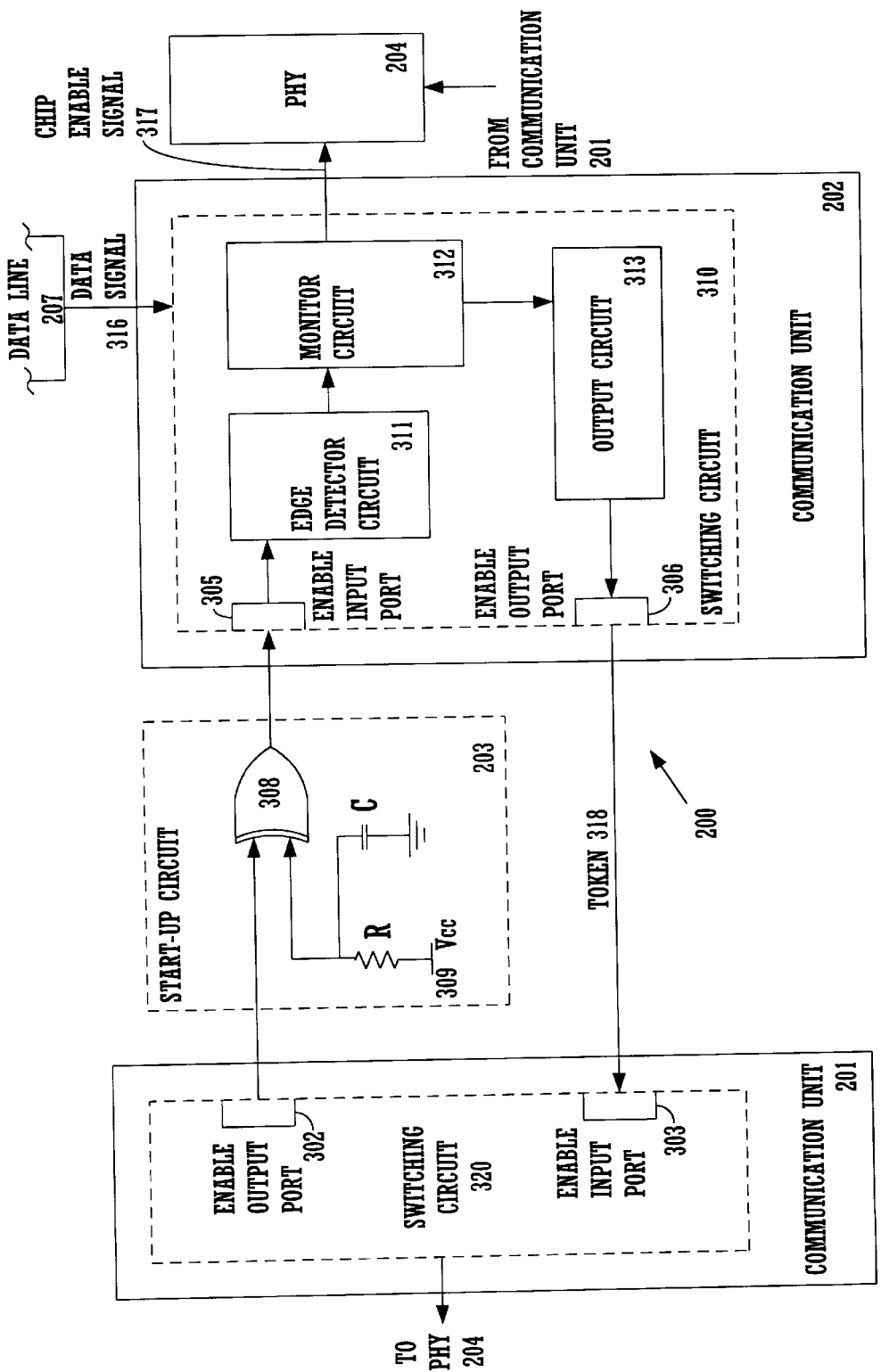
FIG. 3 further illustrates a redundant link system in accordance with a further embodiment the present invention.

FIG. 3 illustrates start-up circuit 203 and communication units 201 and 202 (which may be substantially similar in design) in more detail. In one embodiment, start-up circuit 203 is coupled between enable output port 302 of communication unit 201 and enable input port 305 of communication unit 202. It should be appreciated that, in some embodiments, start-up circuit 203 may be included within one of communication unit 201 or 202. As shown, communication units 201 and 202 include switching circuits 320 and 310, respectively.

Start-up circuit 203 may include voltage source 309 as an input to exclusive OR gate 308. After communication system 200 is initially powered up, exclusive OR gate 308 will receive a logic high signal from voltage source 309 and a logic low signal from communication unit 201. This will cause exclusive OR gate 308 to provide a logic high signal to enable input port 305 of communication unit 202. Initially, the logic high signal is seen as a rising edge at enable input port 305. Note that resistor R and capacitor C are chosen to provide a time constant that will allow communication unit 202 to power up fully before receiving the rising edge of the logic high signal.

Once enable input port 305 receives the output of exclusive OR gate 308, it provides the rising edge of the logic high signal to edge detector circuit 311. Edge detector circuit 311 functions to determine if a transition signal, either from logic high-to-logic low or logic low-to-logic high, has been received at enable input port 305. In the present example, the logic high signal received by edge detector circuit 311 (from start-up circuit 203) after power-up represents a low-to-high transition signal. As a result, edge detector circuit 311 determines that a transition has occurred and passes this information to monitor circuit 312.

Monitor circuit 312 is coupled to PHY 204, data line 207 (e.g., a fiber optic or other communication link) and output circuit 313. When active, monitor circuit 312 serves to generate a signal either to PHY 204 or output circuit 313, depending upon whether a data signal 316 (which may be a signal generated by a remote communication unit to indicate that a link is active/available) is present on data line 207. For example, if data signal 316 is present on data line 207, then monitor circuit 312 will provide chip enable signal 317 to PHY 204. Providing the chip enable signal 317 indicates that communication unit 202 is available to receive a signal from, or transmit a signal to, data line 207. On the other hand, if data signal 316 is not present on data line 207, then monitor circuit 312 will provide a signal to output circuit 313. Providing a signal to output circuit 313 causes communication unit 202 to generate a token 318 which may be used to activate communication unit 201.

Output circuit 313 transmits token 318 (e.g., an electrical signal or pulse) via enable output port 306 of communication unit 202 to enable input port 303 of communication unit 201. At this point switching circuit 320, which may be located within communication unit 201, will perform the same function as switching circuit 320 located within communication unit 202. In other words, switching circuit 310 will attempt to enable communication unit 201 for communication across an associated communication link (e.g., data line 206).

From the above discussion, it should be apparent that the rising edge provided by start-up circuit 203 to communication unit 202 after initial system power up acts as a "start-up token". That is, the rising edge acts as an indication that communication unit 202 may be activated to determine whether its associated communication link (e.g., data line 207) is active (i.e., whether data signal 316 is present). If so, communication unit 202 is enabled to communicate over its associated communication link. This means, in general, that communication unit 202 may transfer signals between its associated communication link and PHY 204. In some cases, communication unit 202 or PHY 204 may transmit a signal to a remote communication unit coupled to the communication link associated with communication unit 202 to indicate that the link is active. Conversely, if communication unit 202 is not enabled (e.g., if no data signal 316 is detected), a token 308 is generated and may be provided to activate communication unit 201, allowing communication unit 201 to determine whether its associated communication link (e.g., data line 206) is active. This process may be accomplished in a similar fashion to that described above.

Figure 4:
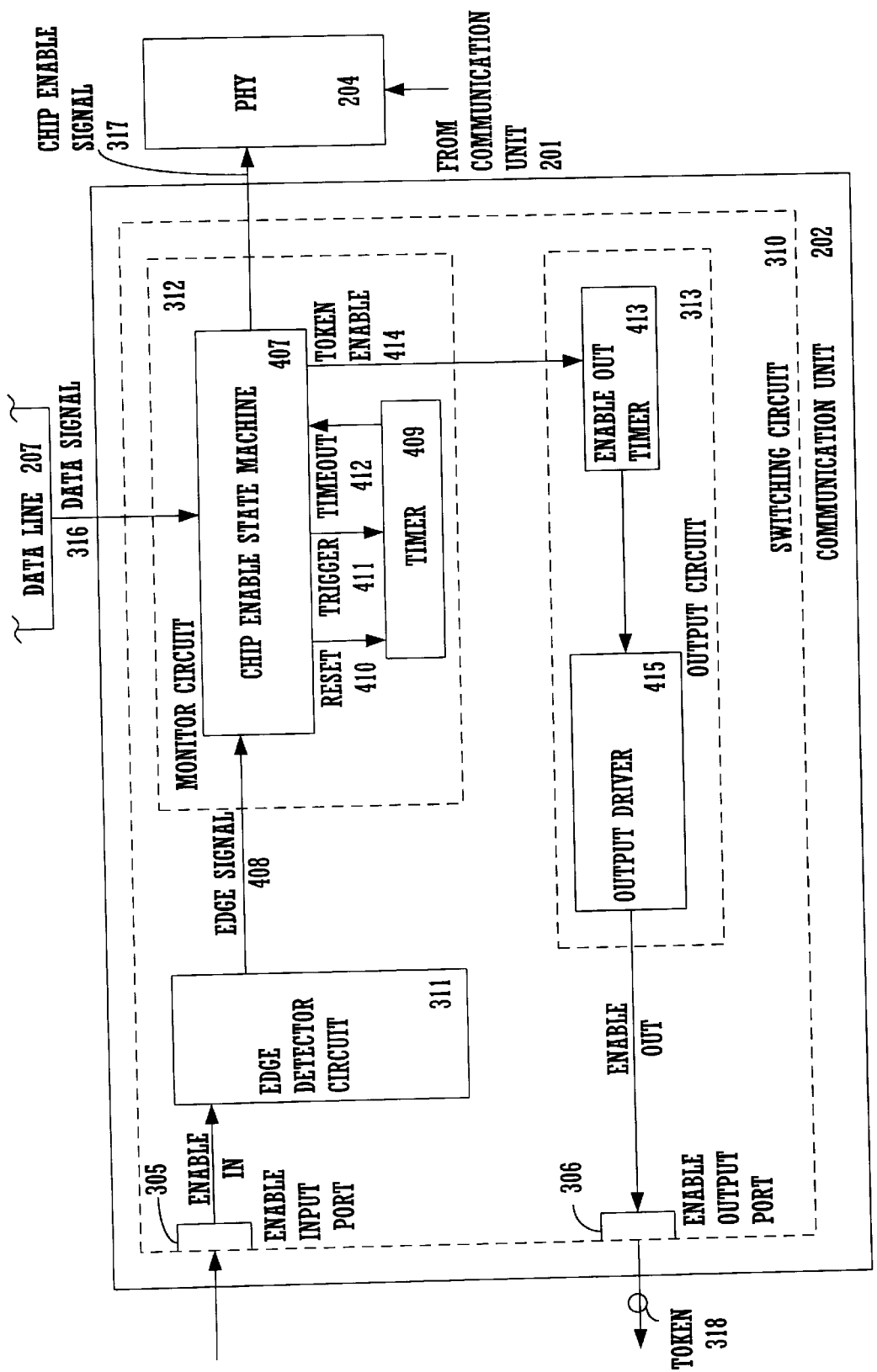
FIG. 4 illustrates a switching circuit configured according to one embodiment of the present invention.

FIG. 4 shows switching circuit 310 in more detail. When edge detector circuit 311 detects a transition from low-to-high or high-to-low, as discussed above, edge signal 408 is provided to monitor circuit 312. Monitor circuit 312 includes chip enable state machine 407 and timer 409. In response to edge signal 408, chip enable state machine 407 searches for the presence of data signal 316. If data signal 316 is present, chip enable state machine 407 asserts chip enable signal 317 to PHY 204, thus indicating that communication unit 202 is available to either receive signals from, or transmit signals to, communication link 315. However, if data signal 316 is not present, chip enable state machine 407 passes token enable signal 414 to output circuit 313.

In one embodiment of the present invention, chip enable state machine 407 will pass token enable signal 414 immediately if data signal 316 is not present at the time chip enable state machine 407 receives edge signal 408. In another embodiment, chip enable state machine 407 will not pass token enable signal 414 unless data signal 316 does not appear for some predetermined period of time. In this instance, if chip enable state machine 407 determines that data signal 316 is not present immediately upon receipt of edge signal 408, it will activate timer 409. Timer 409 functions to establish the predetermined period of time which chip enable state machine 407 will wait for the presence of data signal 316 before passing token enable signal 414 to output circuit 313.

Upon receipt of trigger signal 411, timer 409 starts. In one embodiment, timer 409 may be a count down timer, set to count down from a predetermined value, so as to provide the predetermined period of time for chip enable state machine 407 to "listen" for data signal 316. If data signal 316 is detected by monitor circuit 312 before timer 409 times out, then chip enable state machine 407 will send chip enable signal 317 to PHY 204 and will reset timer 409. However, if data signal 316 is not detected by monitor circuit 312 before timer 409 times out, timer 409 will send time-out signal 412 to chip enable state machine 407. Chip enable state machine 407 will then send token enable signal 414 to output circuit 313. Once chip enable state machine 407 provides an output to either PHY 204 or output circuit 313, chip enable state machine 407 will send reset signal 410 to timer 409 in order to reset timer 409.

FIG. 4 also illustrates the details of output circuit 313 according to one embodiment of the present invention. Output circuit 313 includes enable output timer 413 coupled to output driver 415. When output circuit 313 receives token enable signal 414 from chip enable state machine 407, it provides token 318 through enable output port 306. Output circuit 313 is configured to generate token 318 having characteristics consonant with switching circuit 320 of communication unit 201. For example, enable output timer 413 functions to ensure that token 318 has proper pulse width. Furthermore, output driver 415 functions to ensure that token 318 has the proper electrical characteristics (e.g., minimum voltage). Once generated, token 318 passes through enable output port 306 to enable input port 303 of communication unit 201. Token 318 is then used by communication unit 201 in the same manner as communication unit 202 used the rising edge of the "start-up token" from start-up circuit 203. In this way, tokens, such as token 318, may be passed between communication units (e.g., communication units 201 and 202) until one of the communication units detects a signal on a respective communication link, at which time that communication unit will signal PHY 204 that it is available to communicate over an active communication link.

Returning briefly to FIG. 3, note that after providing the initial rising edge of the "start-up token", start-up circuit 203 continues to provide a logic high signal to edge detector circuit 311. This does not cause a problem because edge detector circuit 311 is configured to be responsive only to a signal transition, i.e., a rising or falling edge. If communication unit 202 has passed token 318 to communication unit 201, communication unit 202 will be inactive, awaiting receipt of a token (e.g., from communication unit 201).

The token from communication unit 201 (which may be generated after a period of time if communication unit 201 determines that its associated communication link is inactive) should be a pulse. For example, a signal having a logic high duration for a given period of time sufficient to allow edge detector circuit 311 to detect its presence. The pulse (or token) will not pass directly from communication unit 201 to communication unit 202, rather, it will first be received at an input of exclusive OR gate 308 of start-up circuit 203. Because the other input of exclusive OR gate 308 still received the logic high signal from voltage source 309, the output of exclusive OR gate 308 will be a pulse (or token) of inverse polarity to that produced by communication unit 201. That is, the token received at edge detector circuit 311 will be a logic low pulse and is first recognized as a falling edge. Edge detector circuit 311 responds by passing edge signal 408 to monitor circuit 312, allowing monitor circuit 312 to begin the process of "listening" for data signal 316 once again.

To simplify the overall design of communication system 200, switching circuit 310 should be substantially similar to switching circuit 320. However, this means that the edge detector circuit of each switching circuit must be responsive to both rising edges (as may be received from start-up circuit 203 upon initial power up or from output circuit 313 when token 318 is produced) and falling edges (as may be received when a token provided by communication unit 201 is "inverted" by exclusive OR gate 308).

Figure 5:
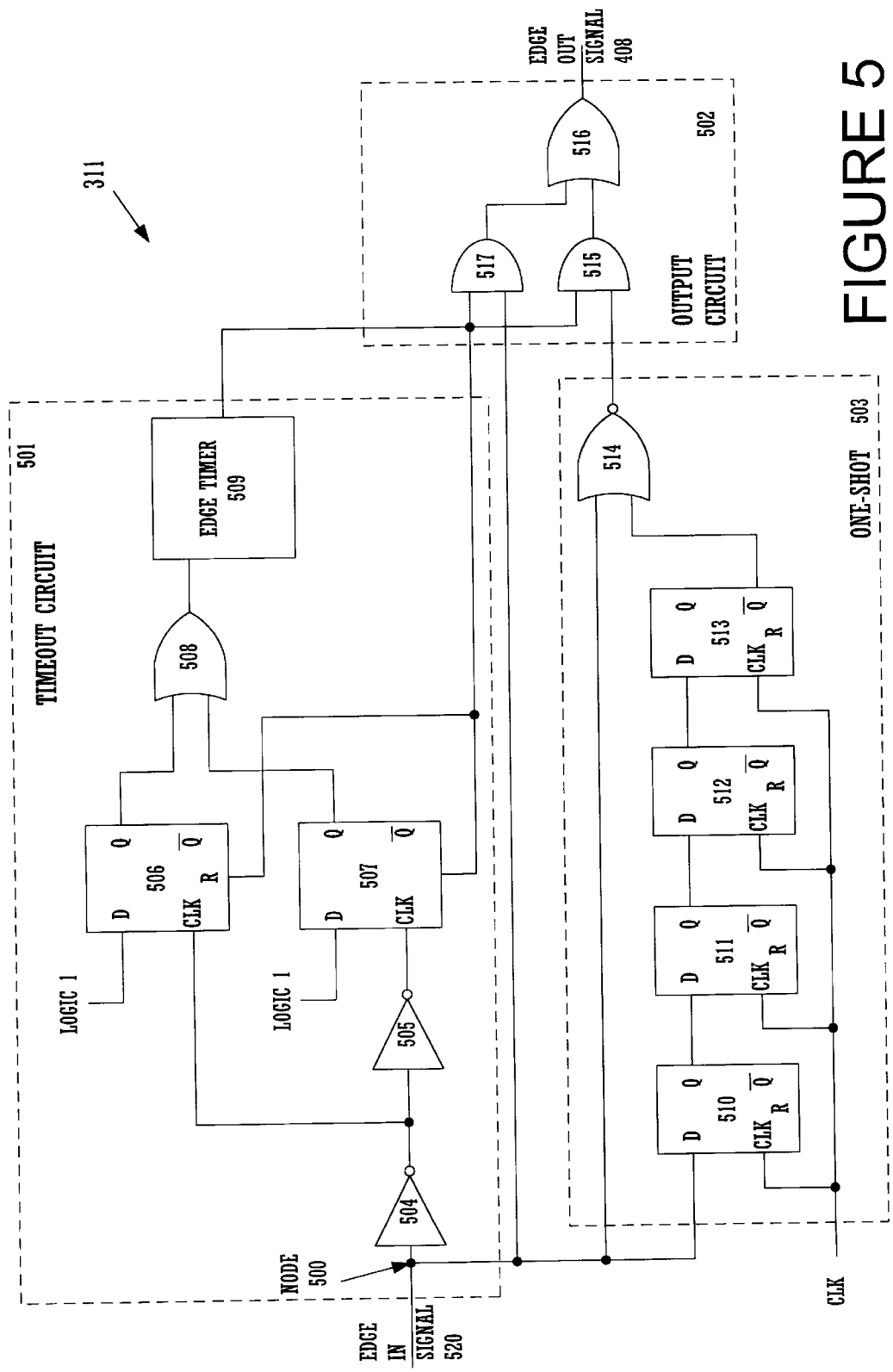
FIG. 5 illustrates an edge detector circuit with time-out according to one embodiment of the present invention.

FIG. 5 shows edge detector circuit 311 in more detail. In one embodiment, edge detector circuit 311 includes time-out circuit 501, output circuit 502, and delay circuit 503. As discussed above, edge detector circuit 311 serves to determine if a high-to-low or low-to-high transition has been received on enable input port 305 of switching circuit 310.

Edge-in signal 520 (which may be produced by start-up circuit 203 or another communication unit) is received at node 500 of time-out circuit 501 from enable input port 305. Node 500 is coupled to delay circuit 503 and output circuit 502. Edge-in signal 520 is first inverted by inverter 504. Thus, for example, if edge-in signal 520 is a low-to-high transition signal (a rising edge), the signal at the output of inverter 504 will be a high-to-low transition signal. The logic low signal is provided to the CLOCK input of D-type flip-flop 506 and also to inverter 505. Inverter 505 inverts the signal to a logic high and the resulting signal is received by the CLOCK input of D-type flip-flop 507. D-type flip-flops 506 and 507 operate to latch data on rising edges of their respective CLOCK signals. Thus, because a logic high is placed on the CLOCK input of D-type flip-flop 507, D-type flip-flop 507 latches the logic high signal at its input and outputs a logic high to OR gate 508. OR gate 508 then provides a logic high output to edge timer 509.

This logic high signal is used to trigger edge timer 509. Edge timer 509 functions to ensure that only a first edge of the edge-in signal 520 (which, as discussed above, may be a pulse signal in the case of a token generated by a communication unit) is considered by switching circuit 310. Although the present invention uses edge timer 509 to detect the first edge only, it should be appreciated that this invention may include other means which allow the circuit to consider only the first edge. Thus, timer 509 provides a pulse of known duration.

The logic high pulse from timer 509 serves two functions. First, the pulse is used to reset both D-type flip-flops 506 and 507 so they may be ready for the next input signal 520 from enable input port 305. In particular, the pulse should be longer in duration than the token (i.e., the edge-in signal pulse). This ensures that the reset inputs of the D-type flip-flops 506 and 507 are held at a logic high sufficiently long enough so that the trailing edge of the pulse comprising the edge-in signal 520 is ignored by flip-flops 506 and 507. Second, the logic high output from timer 509 is coupled to output circuit 502, indicating that the time-out circuit has detected a first edge of an input signal.

The logic high pulse from timer 509 and the logic high edge-in signal 520 are combined in AND gate 517 to provide a logic high signal to OR gate 516. This causes OR gate 516 to provide a logic high output signal (actually a logic high pulse of duration approximately equal to that of edge-in signal 520) which is edge-out signal 408. Edge-out signal 408 is provided to monitor circuit 312 as discussed above.

One-shot circuit 503 also receives edge-in signal 520 and is configured to be responsive to a falling edge signal such as may be received by communication unit 202 when a token is produced by communication unit 201 as discussed above. Assume that the input at node 500 has been logic high for some time, as may be the case after start-up circuit has provided the "start-up token" to communication unit 202. At this point, the output of NOR gate 514 will be logic low.

Also, both inputs to OR gate 516 will be logic low (because the pulse produced by edge timer 509 has ended some time ago), thus the edge-out signal 408 is a logic low.

When a logic low token is received at node 500, the falling edge of the token causes D-type flip-flop 506 to latch the logic 1 input, thus triggering edge timer 509. Edge timer 509 produces a logic high pulse, as described above. Accordingly, AND gate 517 receives a logic high input from edge timer 509. however, because the token is a logic low pulse, the other input of AND gate 517 is a logic low and, accordingly, AND gate 517 produces a logic low output to OR gate 516.

The logic high pulse from edge timer 509 is also received by AND gate 515. Further, AND gate 515 receives a logic high input from NOR gate 514, which acts to "invert" the logic low token received at node 500. Thus, AND gate 515 produces a logic high output signal to OR gate 516. Accordingly, OR gate 516 produces a logic high output (edge-out signal 408) in response to the falling edge signal received at node 500.

The falling edge received at node 500 is also passed through the chain of D-type flip-flops 5190-513 of one-shot circuit 503. After four clock cycles (preferably generated by a clock which is the same source as is used for timer 109), the output of D-type flip-flop 513 will be a logic high signal, which is provided to the second input of NOR gate 514. This causes the output of NOR gate 514 to fall to a logic low which, in turn causes the output of AND gate 515 to fall to a logic low. At this point, both inputs to OR gate 516 will be logic low and, accordingly, the output of OR gate 516 will fall to a logic low, thus defining the trailing edge of the edge-out signal 408.

Note that a rising-edge one shot circuit (such as may be used to implement timer 509) could be constructed in a fashion similar to that illustrated for falling edge one-shot circuit 503 by replacing NOR gate 514 with an AND gate.

FIG. 6 illustrates the various states of state machine 407. State bits D1 and D0, along with the presence or absence of edge detect signal 408, data signal 316 and time-out signal 412 are used by state machine 407 to advance between states and to generate (or not) chip enable signal 317 or token enable signal 414.

Initially (condition 1) state machine 407 is idle, waiting to receive an edge detect signal 408. Upon receipt of such a signal (condition 2), state bit D0 is set and state machine 407 advances to state 01 (condition 3).

At condition 3, state machine 407 is waiting to receive data signal 316. If data signal 316 is not already asserted, state machine 407 asserts trigger signal 411 to start timer 409. This allows state machine 407 to wait for receipt of a data signal 316 (condition 5).

If data signal 316 is received before timer 409 times out (condition 6), timer reset signal 410 is asserted (thus resetting timer 409) and chip enable signal 317 is provided to PHY 204.

If data signal 316 is not received during this time (condition 7), a time out signal 412 will be received and state bits D1 and D0 will be set to 11 (condition 8). At condition 8, token enable signal 414 is provided.

Note that condition 4 corresponds to a situation where data signal 316 is present at the time edge-detect signal 408 is received. In such a case, chip enable signal 317 is provided immediately.

Thus, a redundant link architecture for data communications and methods of using the same have been described.

Although the foregoing discussion highlighted aspects of specifically illustrated embodiments of the invention, those of ordinary skill in the art will appreciate that other configurations are possible. Accordingly, the present invention should in no way be limited to the specific embodiments discussed above, rather, the invention should be measured only in terms of the claims which follow.

What is claimed is:

1. A method, comprising the steps of:
   enabling a communication unit coupled to a communication path if a signal is present on said communication path; otherwise
   generating a token at said communication unit, said token for activating another communication unit.

2. The method of claim 1 further comprising delaying said step of generating a token at said communication unit to determine if said signal is present.

3. The method of claim 1 further comprising selecting said communication unit from a series of communication units prior to said step of enabling said communication unit.

4. The method of claim 3, wherein said step of selecting said communication unit further comprises a step of determining a first communication unit to be activated from a series of communication units.

5. The method of claim 4, wherein said first communication unit is said another communication unit.

6. The method of claim 4, wherein said step of determining said first communication unit includes activating said first communication unit in response to a voltage signal.

7. The method of claim 6, wherein said step of activating said first communication unit further comprises receiving a first edge of a pulse.

8. The method of claim 7, wherein said first edge of said pulse is a rising edge of said pulse.

9. The method of claim 7, wherein said first edge of said pulse is a falling edge of said pulse.

10. The method of claim 1 further comprising transmitting said token from said communication unit to said other communication unit.

11. The method of claim 1, further comprising receiving said signals on said communication path through said communication unit if said communication unit is enabled.

12. The method of claim 1, further comprising transmitting said signals on said communication path through said communication unit if said communication unit is enabled.

13. A communication system, comprising:
   a switching circuit coupled between two communication units and configured to select one of said communication units for operation; and
   a start-up circuit coupled between said two communication units and configured to select a first of said communication units at system power-up.

14. The communication system of claim 13, wherein said start-up circuit comprises an Exclusive OR gate having a first input coupled to a voltage source and a second input coupled to an output of a first of said communication units, said Exclusive OR gate further having an output coupled to a second of said communication units.

15. The communication system of claim 13, wherein said switching circuit is included within one of said communication units.

16. The communication system of claim 13, wherein said switching circuit comprises:
   an edge detector circuit having an input coupled to an enable input port of a first of said communication units;
   an output circuit having an output coupled to an enable output port of a second of said communication units; and
   a monitor circuit having a first input coupled to said edge detector circuit and a second input coupled to a communication path, said monitor circuit further having a first output coupled to said output circuit and a second output configured to provide an enable signal for a communication device coupled to said switching circuit.

17. The communication system of claim 16, wherein said edge detector circuit comprises:
   an output circuit;
   a time-out circuit coupled between said enable input port and said output circuit; and
   a pulse circuit coupled between said enable input port and said output circuit.

18. The communication system of claim 17, wherein said time-out circuit comprises a timer having an output coupled to said output circuit and configured to produce a pulse in response to a transition signal received at said enable input port.

19. The communication system of claim 18, wherein said time-out circuit further comprises:
   a first inverter having an input coupled to receive said transition signal from said enable input port and an output coupled to a clock input of a first D-type flip-flop; and
   a second inverter having an input coupled to said output of first inverter and an output coupled to a clock input of a second D-type flip-flop, said first and second D-type flip-flops having respective outputs coupled to said timer.

20. The communication system of claim 17, wherein said pulse circuit comprises one or more D-type flip-flops arranged to provide a time delay for a signal received at said enable input port.

21. The communication system of claim 17, wherein said output circuit comprises:
   a first AND gate having a first input coupled to an output of said timer and a second input coupled to said enable input port;
   a second AND gate having a first input coupled to an output of said timer and a second input coupled to an output of said pulse circuit; and
   an OR gate having a first input coupled to an output of said first AND gate, a second input coupled to an output of said second AND gate and an output coupled to said monitor circuit.

22. The communication system of claim 16, wherein said monitor circuit is configured to provide said enable signal for said communication device if a signal is present on said communication path, and otherwise to provide a token to said output circuit.

23. The communication system of claim 16, wherein said output circuit comprises:
   an output driver having an output coupled to said enable output port; and
   an enable-out timer having an input coupled to said monitor circuit and an output coupled to said output driver.

* * * * *